United States Patent [19]

Nishikawa et al.

[11] 4,391,342

[45] Jul. 5, 1983

[54] STEERING MECHANISM FOR VEHICLES EQUIPPED WITH POWER STEERING SYSTEM

[75] Inventors: Masao Nishikawa, Tokyo; Yoshihiko Toshimitsu, Asaka; Toshihiko Aoyama, Saitama; Tokuro Takaoka, Tokyo; Takashi Aoki; Yoichi Sato, both of Wako, all of Japan

[73] Assignee: Honda Giken Kogyo Kabushiki Kaisha, Tokyo, Japan

[21] Appl. No.: 239,492

[22] Filed: Mar. 2, 1981

[30] Foreign Application Priority Data

Mar. 10, 1980 [JP] Japan .............................. 55-30729[U]

[51] Int. Cl.[3] .......................... B62D 5/06; B62D 1/16
[52] U.S. Cl. .................................... 180/143; 180/132; 74/492; 91/375 A; 280/89
[58] Field of Search ....................... 180/148, 132, 143; 91/375 A; 74/492; 464/97; 280/780, 89

[56] References Cited

U.S. PATENT DOCUMENTS 3,138,069  6/1964  Bishop .............................. 91/375 A

FOREIGN PATENT DOCUMENTS 2421966  5/1975  Fed. Rep. of Germany ...... 280/780
979773  5/1951  France ................................ 280/780
52-47226  4/1977  Japan ..................................... 74/492
52-47227  4/1977  Japan ..................................... 74/492

Primary Examiner—John A. Pekar
Attorney, Agent, or Firm—Irving M. Weiner; Pamela S. Burt; John L. Shortley

[57] ABSTRACT

A steering mechanism for vehicle equipped with a power steering system, the steering mechanism including a resilient element, such as a torsion bar, which is interposed in a path of torque transmission between a steering wheel and a power steering unit which provides an increased steering reactive force in proportion to vehicle speed. The steering mechanism includes a damper arrangement disposed between two relatively rotatable members which are operably associated with each other through the resilient element. The damper arrangement attenuates torsional vibrations of a first one of the relatively rotatable members disposed on the side of the steering wheel, such vibrations being caused by the interposed resilient element and the moment of inertia of the steering wheel.

7 Claims, 2 Drawing Figures

STEERING MECHANISM FOR VEHICLES EQUIPPED WITH POWER STEERING SYSTEM

BACKGROUND OF THE INVENTION (1) Field of the Invention

The present invention relates to a steering mechanism for vehicles equipped with a power steering system, and more particularly to a steering mechanism which includes a resilient element such as a torsion bar interposed in a path of torque transmission between a steering wheel and a power assisting system adapted to boost the steering reactive force in response to the vehicle speed, and in which a damper means is provided to attenuate torsional vibrations of the steering wheel due to the interposed resilient element.

(2) Description of Prior Art

In related commonly-assigned U.S. Pat. No. 4,310,063 issued Jan. 12, 1982, there is disclosed a power steering mechanism, wherein a resilient body such as a torsion bar, which is capable of torsional deformation to produce a resilient force in a rotational direction, is interposed in a path of torque transmission between a steering wheel and a power assisting system which is designed to increase the steering reactive force in proportion to the vehicle speed, thereby varying the ratio of the steering wheel turn angle to the road wheel turn angle in response to the vehicle speed. This arrangement has advantages in that a large turn angle of the road wheels can be obtained by a relatively small turn angle of the steering wheel in parking or low-speed movement of the vehicle, while the so-called over-handling of the steering wheel in high-speed running is prevented.

However, since the afore-mentioned torsion bar has particular resilient characteristics in the torsional direction and a steering wheel having a moment of inertia is attached to this torsion bar, a free vibrational system is formed so that the steering wheel will be repeatedly subject to fine vibrations whenever the steering wheel is relieved from the manual turning force of a driven position and returns to its center position, thereby giving an uncomfortable feeling to the driver. Such behavior of the steering wheel is undesirable from the standpoint of the feeling of steering because it is directly gripped by a driver who is required to concentrate on driving the vehicle.

The present invention has been provided to eliminate the above-mentioned drawback.

OBJECTS OF THE INVENTION

It is an object of the present invention to provide a steering mechanism for a vehicle equipped with a power steering system, which is simple in construction and capable of attenuating and preventing vibrations due to the resiliency of an inserted resilient element such as a torsion bar and the moment of inertia of the steering wheel, thereby precluding fine repeated vibrations of the steering wheel to ensure a favorable steering feeling.

It is another object of the present invention to provide a steering mechanism for a vehicle equipped with a power steering system, which contributes to the reduction of beating noises as would be produced, for example, during operations on a bumpy road, at a fitting joint of two members which are connected through a resilient element and one of which is rotatably fitted in the other member with a small clearance provided therebetween.

DETAILED DESCRIPTION OF PREFERRED EMBODIMENT

Figure 1:
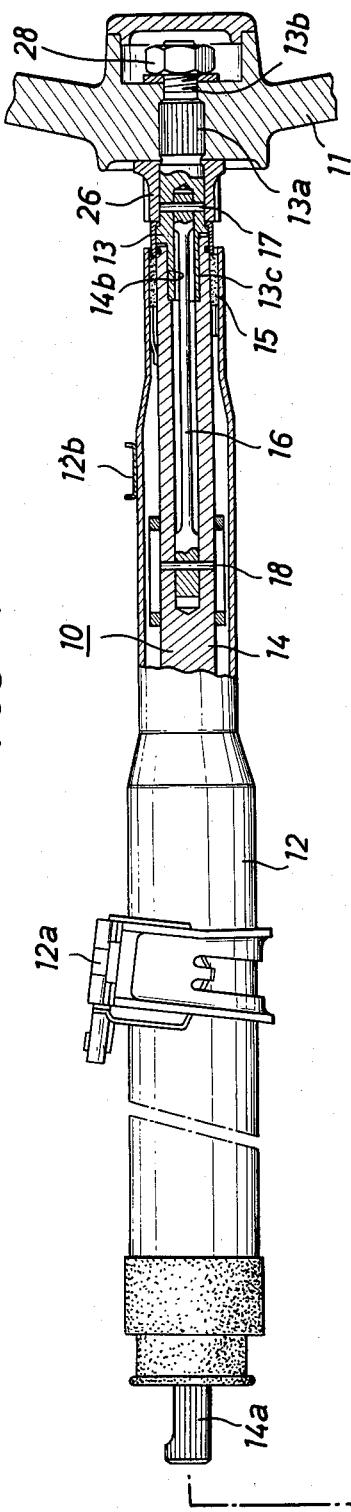
FIG. 1 is a partly cutaway side view of a power steering system incorporating the steering mechanism according to the present invention, showing on the left side the power steering unit which will be located beneath the steering column and on the right side a steering wheel which will be located at the upper end of the steering column.

With reference to FIG. 1, a steering wheel 11 is mounted at the upper end of a steering shaft 10 which is in turn fitted in a hollow housing tube 12. The housing tube 12 is fixed to the vehicle body by brackets 12a and 12b and forms a stationary structure. The steering shaft 10 comprises a combination of an input shaft 13 on the side of the steering wheel 11 and an output shaft 14 on the side of a power steering unit 30. An end portion 14a of the output shaft 14 which is protruded through an open lower end of the housing tube 12 is coupled with the power steering unit 30, the construction of which is as follows.

The power steering unit 30 includes a pinion shaft 31 which is connected to the output shaft end 14a through a suitable mechanical coupling means (not shown), and a rack shaft 32 which is meshed with the pinion shaft 31, converting the rotary movements of the pinion shaft 31 resulting from manipulation of the steering wheel 11 into linear movements of the rack shaft 32 to effect the steering of the vehicle wheel in the usual manner. A four-way change-over valve 33 is operated by the rotary movements of the pinion shaft 31 selectively to supply a fluid pressure to two chambers (not shown) of a power cylinder, thereby assisting the steering power depending on the turning directions of the steering wheel 11. The power steering unit 30 further has a reaction mechanism 37 which produces a steering reactive force in proportion to the vehicle speed and thus provides the driver with variable steering reactive forces, the reaction mechanism 37 including an oil chamber 35, plunger 34, and spring 36. The increase of the steering reactive force in proportion to the vehicle speed is limited by means of a limit valve (not shown) when it reaches a predetermined level.

The construction and operations of the foregoing power steering mechanism is disclosed in U.S. Pat. No. 3,994,361 issued to the present applicant, the subject matter of which patent is incorporated herein by reference thereto.

The input shaft 13 which constitutes a part of the steering shaft 10 on the side of the steering wheel 11, is provided with serration 13a and screw threaded portion 13b in its end portion and is connected to the steering wheel 11 by a nut 28 which meshes with the screw 13b. The output shaft 14 is rotatably supported in the housing tube 12, for example, through synthetic resin bearings 15 which are located in the upper and lower end portions of the housing tube 12 (only the upper bearing being shown in FIGS. 1 and 2). The input shaft 13 and output shaft 14 have the respective lower and upper end portions thereof hollowed to receive a torsion bar 16 which is connected at its opposite ends to the input and output shafts 13 and 14 by pins 17 and 18, respectively. The input shaft 13 has a smaller diameter portion 13c at its lower distal end, which is rotatably fitted in a bearing bore 14b at the upper end of the output shaft 14 to permit rotations relative to the latter.

Thus, the torsion bar 16 which has a resilient force in the rotational direction of the steering wheel 11, is interposed in the path of torque transmission formed by the steering shaft 10 between the steering wheel 11 and the power steering unit 30. With such arrangement, the ratio of the turn angle of the steering wheel to the turn angle of the road wheels can vary according to the vehicle speed by the combination of the torsion bar 16, which is capable of torsional elastic deformation, with the power steering system 30 which increases the steering reactive force in proportion to the vehicle speed.

Figure 2:
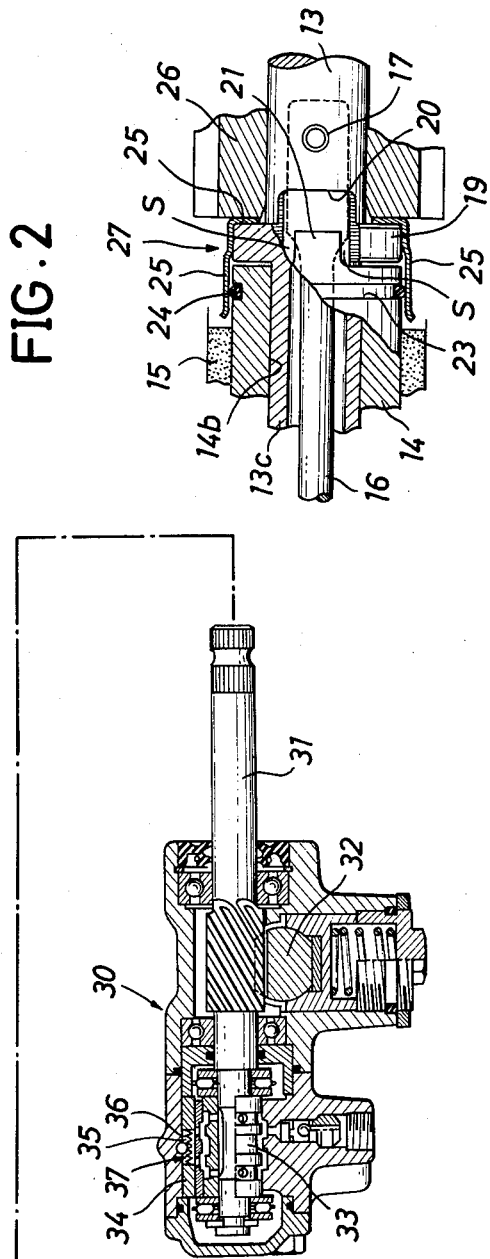
FIG. 2 is an enlarged view of a damper and associated parts of the steering mechanism of FIG. 1.

As shown in FIG. 2, a flange 19 is formed on the outer periphery of the input shaft 13. A pair of recesses 20 are also formed at radially opposing positions of the outer peripheral surface of the shaft 13 including the flange 19, for engagement with an axial claw 21 which is formed integrally with and extended axially from the upper end of the output shaft 14. The claw 21 is slightly smaller than the recesses 20 in circumferential width, leaving small clearances S at circumferentially opposite sides of the claw 21, which is positioned centrally of the recesses 20 when the torsion bar 16 is in unloaded state as shown in the drawing. If the steering wheel 11 is turned clockwise or counterclockwise through a predetermined angle, the claw 21 abuts against the inner side wall of the recesses 20 to block further torsional deformation of the torsion bar 16, thereby precluding imposition of an unduly large load on the torsion bar 16.

The output shaft 14 has an annular groove 23 formed on the outer periphery of its upper end portion, and a damper ring 24 of rubber or synthetic resin material is fitted therein. Fitted over the damper ring 24 is a damper cover 25 of a substantially cylindrical shape having an annular end wall or an inward projection 25a at one end of a substantially cylindrical body 25b having the inner peripheral surface thereof in contact with the ring 24. The damper cover 25 is carried on the flange 19 of the shaft 13 with the annular wall portion 25a being in abutting engagement with the upper side of the flange 19.

Fixedly mounted on the outer periphery of the input shaft 13 is a turn signal cancel cam 26 which grips in position the annular wall portion 25a of the cover 25 in cooperation with the flange 19, thereby fixing the cover 25 on the input shaft 13. Thus, the fixation of the damper cover 25 on the input shaft 13 can be attained by the use of a turn signal cancel cam which is already provided on the steering column.

The steering wheel 11 and input shaft 13 are connected with each other by inserting the threaded portion 13b at the upper end of the input shaft 13 into the steering wheel 11 and tightening the nut 28 on the threaded portion 13b which is projected out of the steering wheel 11. Upon tightening the nut 28, the cancel cam 26 which is mounted on the input shaft 13 on the front side of the steering wheel 11 is urged toward the damper cover 25. It will thus be understood that the fixation of the end wall portion 25a of the cover 25 between the flange 19 and cancel cam 26 is achieved simultaneously with the assembling of the steering wheel 11 with input shaft 13.

In the foregoing arrangement, the ring 24 and cover 25 constitute a damper means 27 between two members which are associated through the torsion bar 16, i.e., the input shaft 13 on the side of the steering wheel 11 and the output shaft 14 on the side of the power steering unit 30 relative to which the input shaft 13 is rotatable.

The input shaft 13 tends to return to a center position relative to the output shaft 14 due to the torsional energy charged in the torsion bar 16 once the steering wheel has been turned and freed of the manual steering force. In this instance, the damper ring 24 is held in frictional sliding contact with the bottom or side walls of the annular groove 23 and the inner peripheral surface of the cylindrical body 25b of the damper cover 25, so that the torsional vibrations of the steering wheel 11 due to its moment of inertia are attenuated and extinguished by the rotory frictional force. This attenuating force can be varied and set at a suitable value by selecting the hardness of the damper ring 24 and the contacting force of the damper cover 25 on the ring 24 or the like.

The attenuating force by the damper ring 24 and damper cover 25 is produced only between the input shaft 13 and output shaft 14. Therefore, no attenuating force is imposed when the input and output shafts 13 and 14 are rotated together, for example, such as when the road wheels return to center positions spontaneously by the aligning force upon releasing a turning force on the steering wheel. Consequently, there is no possibility of an adverse effect being imposed on the restorative force of the steering wheel 11.

Although in the foregoing embodiment the damper ring 24 and damper cover 25 are provided on the output shaft 14 and input shaft 13, respectively, their positions may be switched if desired.

Further, the damper means may be provided between the input shaft 13 and the stationary housing tube 12 in a case where the steering wheel 11 is not required to have a good restorative force. Such an arrangement is possible because the input shaft 13 is rotatable relative to the housing tube 12 as well as to the output shaft 14.

In addition to the prevention of the torsional vibrations of the steering wheel 11, the present invention is further advantageous in that the damper ring 24 and the damper cover 25 also serve to prevent the beating noises which occasionally occur, for example, during travel on a bumpy road, at the fitting joint portion of the smaller diameter portion 13c of the input shaft 13 and the bearing bore 14b of the output shaft 14, between which there is necessarily formed a clearance. Thus, the damper means 27 has a radial cushioning function as well.

What is claimed is:

1. A steering mechanism for a vehicle equipped with a power steering unit producing an increased steering reactive force in proportion to vehicle speed and a resilient element interposed in a path of torque transmission between a steering wheel and said power steering unit, comprising:
   a damper means provided between two relatively rotatable members operably associated with each other through said resilient element, whereby torsional vibrations of a first one of said members disposed on the side of said steering wheel, caused by the resiliency of said resilient element and the moment of inertia of said steering wheel, are attenuated;

said damper means comprising two elements adapted to produce a frictional force when one of said elements rotates relative to the other of said elements; and said two elements of said damper means comprising a ring and a cover fitted on the outer periphery of said ring.

2. A steering mechanism according to claim 1, wherein:

a second one of said members, relative to which said first one of said members on the side of said steering wheel is rotatable, is disposed on the side of said power steering unit.

3. A steering mechanism according to claim 1, wherein:

a second one of said members, relative to which said first one of said members on the side of said steering wheel is rotatable, is a stationary member.

4. A steering mechanism according to claim 3, wherein:

said path of torque transmission is defined by a steering shaft; and said stationary member comprises a housing tube accommodating said steering shaft therein.

5. A steering mechanism according to claim 1, wherein:

said ring is fitted in an annular groove on a first one of said two relatively rotatable members; and said cover is fixed on a second one of said members with the inner peripheral surface thereof in contact with said ring.

6. A steering mechanism according to claim 5, wherein:

said cover has a substantially cylindrical shape with an inwardly extending projection provided at one end thereof and fitted on the outer periphery of said second one of said members on the side of said steering wheel;

said second one of said members is provided with an outwardly extending flange and has a turn signal cancel cam fixedly mounted on the outer periphery thereof; and said projection of said cover is grippingly fixed in position by said flange and said turn signal cancel cam.

7. A steering mechanism according to claim 6, wherein:

said first one of said members on the side of said steering wheel is provided with a threaded portion in one end portion thereof and is fixed to said steering wheel by a nut tightened on said threaded portion projected through said steering wheel while said projection of said cover is simultaneously grippingly fixed between said flange and said cancel cam.

* * * * *